Nov. 23, 1937.   L. V. ANDREWS   2,100,020
PULVERIZING APPARATUS
Filed March 14, 1934   2 Sheets-Sheet 2

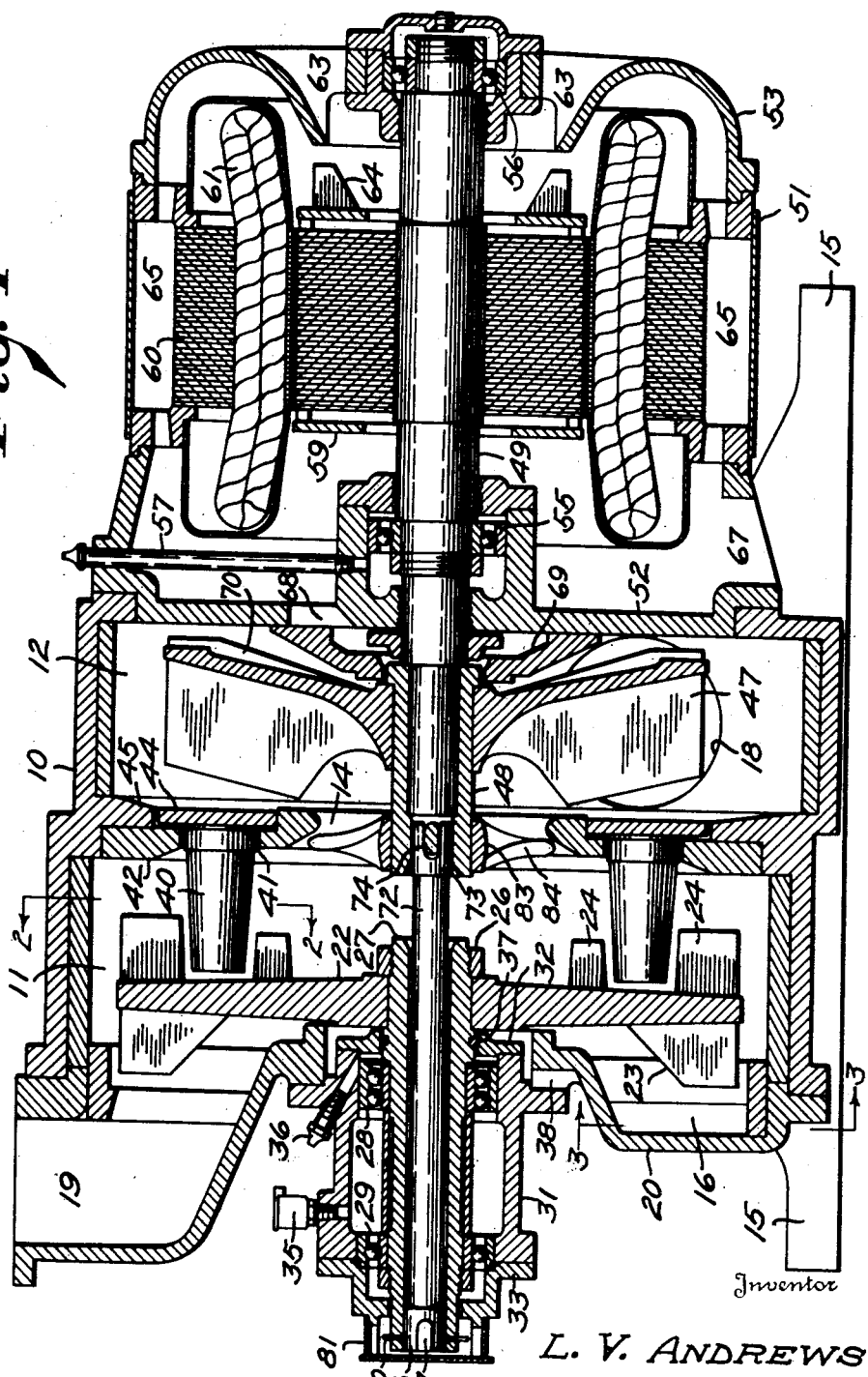

Inventor
L. V. ANDREWS
By Albert G. Blodgett
Attorney

Patented Nov. 23, 1937

2,100,020

UNITED STATES PATENT OFFICE 2,100,020

PULVERIZING APPARATUS

L. V. Andrews, Worcester, Mass., assignor to Riley Stoker Corporation, Worcester, Mass., a corporation of Massachusetts Application March 14, 1934, Serial No. 715,399

13 Claims. (Cl. 83—11)

This invention relates to pulverizing apparatus, and more particularly to apparatus of the rotary beater type in which material is finely pulverized by the action of rapidly revolving impact members.

It is one object of the invention to provide a pulverizing apparatus in which the various parts subject to wear are easily and conveniently replaceable.

It is a further object of the invention to provide a pulverizing apparatus so constructed and arranged that the various parts subject to wear may be replaced without removing the driving shaft from its bearings.

It is a further object of the invention to provide a pulverizing apparatus and a driving motor therefor which are combined in a novel manner into an extremely compact construction.

It is a further object of the invention to provide a combined pulverizer and electric motor so arranged that the motor will be effectively cooled and the entrance of dust or hot air from the pulverizer into the motor or its bearings will be prevented.

It is a further object of the invention to provide a pulverizing apparatus of the type having a pulverizing rotor and a fan, which can be operated at very high speeds without excessive vibration.

It is a further object of the invention to provide an improved rejector device for a pulverizing apparatus, which will effectively prevent the escape of coarse particles of material from the pulverizing chamber and which will return such particles for further grinding.

With these and other objects in view, as will be apparent to those skilled in the art, the invention resides in the combination of parts set forth in the specification and covered by the claims appended hereto.

Referring to the drawings illustrating one embodiment of the invention, and in which like reference numerals indicate like parts, Fig. 1 is a longitudinal section through a combined pulverizing apparatus and electric motor;

Figure 4:
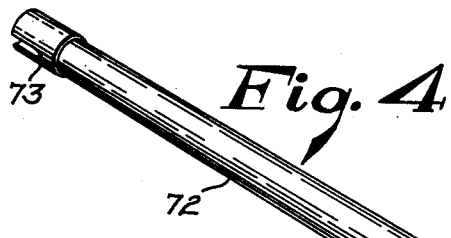
Fig. 4 is a perspective view of the connecting shaft.

The embodiment illustrated comprises a casing 10 shaped to provide a pulverizing chamber 11 and a fan chamber 12 which communicate through a centrally located passage or opening 14 forming an outlet for the pulverizing chamber. The casing is provided with supporting feet 15 which may be bolted to a suitable foundation. Coarse material is introduced into the pulverizing chamber through an inlet chute 16, and the pulverized material passes through the opening 14 and escapes from the fan chamber through a tangentially located discharge opening 18. The air required for conveying the material through the machine is introduced into the pulverizing chamber through an inlet duct 19. Both the inlet chute 16 and the air inlet duct 19 are formed in a plate 20 secured to the main body of the casing 10 and forming the outer end-wall of the pulverizing chamber.

A pulverizing rotor 22 is mounted within the chamber 11. This rotor is shown as a vertical disk provided with an annular row of impact members 23 on the side toward the inlet 19 and two spaced annular rows of impact members or pegs 24 on the side toward the outlet 14. The rotor disk 22 is fastened by means of a nut 26 to one end of a horizontal shaft 27, which is preferably made hollow for reasons to be explained hereinafter. The shaft 27 extends a substantial distance from the inlet side of the rotor and is supported in two axially spaced inner and outer ball-bearings 28 and 29 which are mounted in a bearing housing 31 fastened to the casing end-plate 20. The housing 31 is provided with inner and outer end-plates 32 and 33. Oil is supplied to the bearings through an oil cup 35. In order to prevent the suction produced by the operation of the pulverizer from drawing oil out of the bearing housing, a grease fitting 36 is provided so that grease may be introduced into the space between the inner bearing 28 and the inner end-plate 32 to form a seal. The grease is effectively retained by means of a resilient metal ring 37 similar to a piston ring mounted in a groove in the shaft 27 and contacting with the surrounding wall of the inner end-plate 32. One or more openings 38 are preferably provided between the inner portion of the bearing housing 31 and the casing end-plate 20, so that a small current of air may flow therethrough to prevent any accumulation at this point of fine particles of the material being pulverized. It will be noted that the rotor disk 22 is secured to an overhung end portion of the shaft 27, both of the bearings 28 and 29 being located outside of the pulverizing chamber 11.

An annular row of stationary pegs 40 is preferably provided surrounding the outlet 14 and arranged to cooperate with the pegs 24 in the pulverization of the material. These pegs 40 extend between the rows of pegs 24 and nearly to the rotor disk 22. The stationary pegs are preferably provided with flanged ferrules 41 as disclosed in the patent to Riley No. 1,576,472, and they are supported by a vertical plate 42 which serves as a dividing wall between the pulverizing chamber 11 and the fan chamber 12. The outlet opening 14 is formed in this plate. The pegs 40 are held in place in the plate 42 by means of an annular clamping plate 44 secured to the fan chamber side thereof. The plate 42 is fastened to the pulverizing chamber side of an annular flange 45 which projects inwardly from the surrounding wall of the casing 10.

In order to produce a current of air to carry the material through the apparatus, a rotatable fan 47 is mounted in the fan chamber 12. This fan is secured to a sleeve 48 mounted on the inner end of the horizontal shaft 49 of an electric motor 51. The motor shaft is arranged in substantial axial alignment with the shaft 27. The motor 51 is provided with inner and outer end-plates 52 and 53 respectively, and the inner end-plate 52 is fastened to the casing 10 and forms one wall of the fan chamber 12. The shaft 49 is supported in a ball-bearing 55 in the end-plate 52 and a ball bearing 56 in the end-plate 53. The bearing 55 is supplied with lubricant through a pipe 57. The motor 51 as shown is of the alternating current type, and comprises a rotor 59 mounted on the shaft 49, a stator 60, and stator windings 61. It will be noted that the fan 47 is secured to an overhung end portion of the motor shaft 49, both of the bearings 55 and 56 being located outside of the fan chamber 12.

The motor 51 is ventilated and cooled by a current of air which preferably flows therethrough in a general direction toward the fan chamber 12, thus preventing fine material or hot air from escaping from the fan chamber into the motor. For this purpose the outer end-plate 53 of the motor is provided with one or more inlet openings 63, and fan blades 64 are mounted on the outer end of the rotor 59 and arranged to draw air inwardly through the openings 63 and force this air through a passage 65 around the stator 60. The air escapes through an outlet opening 67 in the lower portion of the inner end-plate 52. To prevent any possible accumulation of fine material near the bearing 55, a small stream of air is preferably allowed to flow through a by-pass opening 68 in the end-plate 52 into the axial region of the fan chamber. This stream is baffled by an annular plate 69 mounted on the end-plate 52 and closely surrounding the adjacent portion of the sleeve 48. The desired air-flow is facilitated by the provision of ribs 70 on the outer face of the fan 47.

Figure 5:
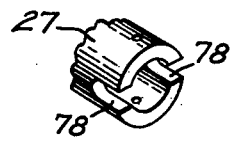
Fig. 5 is a perspective view of the outer portion of the rotor shaft.
Figure 2:
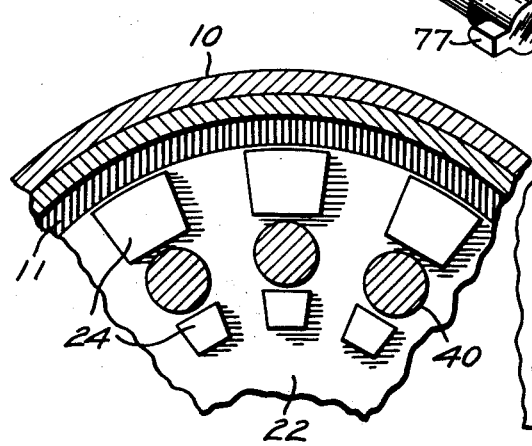
Fig. 2 is a section on the line 2—2 of Fig. 1.
Figure 3:
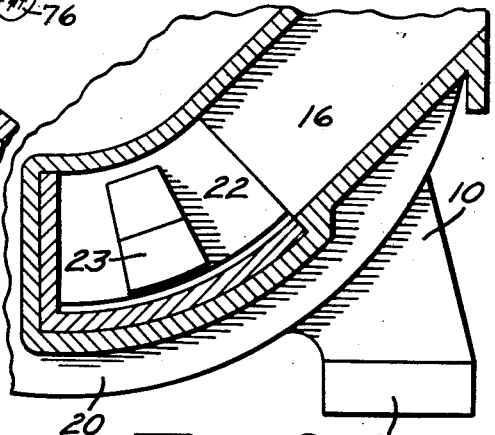
Fig. 3 is a section on the line 3—3 of Fig. 1.
Figure 8:
Fig. 8 is a top plan view of the device shown in Fig. 7.
Figure 6:
Fig. 6 is an end view of the motor shaft sleeve.

The pulverizing rotor 22 is arranged to be driven by the motor 51, and for this purpose the shafts 27 and 49 are operatively connected. The connecting means is preferably so arranged as to transmit torque without appreciable radial or thrust loads irrespective of slight misalignment of the shafts. In the preferred construction illustrated the motor shaft 49 is connected to the remote end of the hollow shaft 27 by means of a shaft 72 which extends through the hollow shaft. The inner end portion 73 of this connecting shaft is forked and fits rather closely within the adjacent end of the sleeve 48, straddling a transverse bar 74 welded or otherwise secured within the sleeve. The outer end portion 76 of the shaft 72 fits rather closely within the outer portion of the hollow shaft 27 and is provided with two radially projecting lugs 77 which engage slots 78 (Fig. 5) in the end of the hollow shaft. A cotter pin 80 (Fig. 1) extends through the shafts 27 and 72 to prevent axial movement of the latter. A protecting cap 81 is removably fastened to the bearing end-plate 33 and encloses the ends of the shafts.

Figure 7:
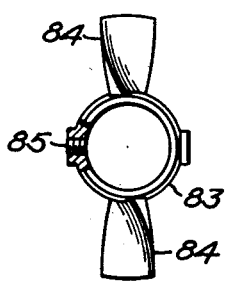
Fig. 7 is an axial elevation of the rejector device.

It is desirable to provide means to prevent the escape of coarse particles of material through the opening 14 into the fan chamber. For this purpose there is shown a rejector device comprising a central supporting portion in the form of an annular hub 83, and two blades 84 extending from the hub in opposite radial directions. The hub 83 is mounted on the sleeve 48 and is held in place by a set-screw 85 (Fig. 7). Each of the blades 84 is twisted at an angle with the axis of rotation, so that the rejector is similar in shape to a screw propeller. Because of the inclination of the blades to the direction of flow through the outlet 14, coarse particles which are struck by them will be given a decided axial component of movement toward the rotor disk 22 and thus into the path of the revolving pegs 24. In apparatus of the type disclosed the general direction of flow in the space between the rotor disk and the plate 42 is inwardly toward the axis, but the revolving pegs 24 set up a recirculation, so that the flow close to the rotor disk is outwardly away from the axis. Hence, if coarse particles are thrown far enough toward the rotor to be caught in this recirculating stream they will be subjected to further pulverization.

The operation of the invention will now be apparent from the above disclosure. The material to be pulverized is delivered by a suitable feeding mechanism to the chute 16 and falls into the path of the impact members 23 which perform a preliminary crushing operation. Air, which has preferably been heated, enters the machine through the passage 19, and the air current carries the crushed material around the periphery of the rotor disk 22 and into the pulverizing zone where it is reduced to a very fine powder by the action of the pegs 24 and 40. The stream of air and pulverized material flows through the opening 14 into the fan chamber 12 and is discharged through the outlet 18 by the action of the revolving fan 47. Coarse particles of material which reach the opening 14 will be struck by the propeller-shaped rejector blades 84 and thrown back toward the rotor disk, where they will be caught by the recirculating air current and carried into the path of the pegs 24 for further pulverization.

The shafts 27 and 49 are rotatable in independent bearings, and because of the arrangement of the connecting shaft 72 only torsional forces can be transmitted between the shafts. Extremely accurate alignment is therefore unnecessary, and the machine is suitable for very high speed operation. For example, in one commercial construction having a rotor diameter of 15 inches, the parts are rotated at a speed of approximately 3600 revolutions per minute. The construction is self-contained and extremely compact.

It will be apparent that by reason of the overhung arrangement of the shafts and the other features of the construction the bearings are well protected and the various parts are very accessible for replacement after they have become worn. The casing end-plate 20, with the shaft 27 and its bearings and the rotor 22 can all be removed as a unit, after which the rotor can be readily replaced. It is not necessary to disturb the mounting of the shaft in its bearings. The rejectors 84 can then be removed, and the plate 42 with the pegs 40 and the clamping plate 44 can thereupon be withdrawn as a unit through the opening left by the end-plate. This will make it possible to withdraw the fan 47 through the opening left by the plate 42. The connecting shaft 72 can be withdrawn axially by first removing the cap 81 and the cotter pin 80, without disturbing any other parts of the machine.

The motor 51 is ventilated and cooled by the air current produced by the fan blades 64, and since the general direction of flow is toward the fan chamber 12 there will be a slight air pressure around the bearing 55 which will prevent any fine material or hot air from reaching this bearing from the fan chamber. The ribs 70 on the fan 47 maintain a slight air flow through the opening 68 into the fan chamber and thus make it still more difficult for dust to reach the motor bearings.

Having thus described my invention, what I claim as new and desire to secure by Letters Patent is:

1. A pulverizing apparatus comprising a casing shaped to provide a pulverizing chamber and a fan chamber communicating therewith, a rotatable shaft, a pulverizing rotor secured to the shaft and located in the pulverizing chamber, bearings supporting the shaft, a second rotatable shaft substantially aligned with the first shaft, a fan secured to the second shaft and located in the fan chamber, bearings supporting the second shaft independently of the first shaft, and means operatively connecting the two shafts to transmit torque from one to the other.

2. A pulverizing apparatus comprising a casing shaped to provide a pulverizing chamber and a fan chamber communicating therewith, a rotatable shaft having an overhung end portion, a pulverizing rotor secured to said end portion and located within the pulverizing chamber, a second rotatable shaft substantially aligned with the first shaft and having an overhung end portion, a fan secured to the said end portion of the second shaft and located within the fan chamber, and means operatively connecting the two shafts to transmit torque from one to the other.

3. A pulverizing apparatus comprising a casing shaped to provide a pulverizing chamber and a fan chamber communicating therewith, a rotatable shaft having an overhung end portion projecting into the pulverizing chamber, a pulverizing rotor secured to said end portion and located within the pulverizing chamber, a second rotatable shaft substantially aligned with the first shaft and having an overhung end portion projecting into the fan chamber, a fan secured to the said end portion of the second shaft and located within the fan chamber, and means operatively connecting the two shafts to transmit torque from one to the other.

4. A pulverizing apparatus comprising a casing shaped to provide a pulverizing chamber and a fan chamber communicating therewith, two substantially aligned rotatable shafts, bearings supporting the shafts independently, one shaft having an overhung end portion projecting into the pulverizing chamber and the other shaft having an overhung end portion projecting into the fan chamber, a pulverizing rotor secured to the said end portion of the first shaft and located within the pulverizing chamber, a fan secured to the said end portion of the second shaft and located in the fan chamber, and means operatively connecting the two shafts to transmit torque from one to the other.

5. A pulverizing apparatus comprising a casing shaped to provide a pulverizing chamber and a fan chamber which communicate through a centrally located passage, a rotatable shaft arranged with its axis adjacent to the passage, bearings supporting the shaft, a rotor disk secured to the shaft and located in the pulverizing chamber, impact members on the side of the disk toward the passage, a second rotatable shaft substantially aligned with the first shaft, a fan secured to the second shaft and located in the fan chamber, bearings supporting the second shaft independently of the first shaft, and means operatively connecting the two shafts to transmit torque from one to the other.

6. A pulverizing apparatus comprising a casing shaped to provide a pulverizing chamber and a fan chamber which communicate through a centrally located passage, two substantially aligned rotatable shafts arranged with their common axis adjacent to the passage, the adjacent end portions of the shafts being overhung, a rotor disk secured to the overhung portion of one shaft and located in the pulverizing chamber, impact members on the side of the disk toward the passage, a fan secured to the overhung portion of the other shaft and located in the fan chamber, and means operatively connecting the two shafts to transmit torque from one to the other.

7. A pulverizing apparatus comprising a casing shaped to provide a pulverizing chamber and a fan chamber communicating therewith, a motor having a rotatable shaft provided with an overhung end portion, a second rotatable shaft substantially aligned with the motor shaft and having an overhung end portion, means operatively connecting the shafts to transmit torque from the motor shaft to the second shaft, a pulverizing rotor secured to one of said end portions and located in the pulverizing chamber, and a fan secured to the other of said end portions and located in the fan chamber.

8. A pulverizing apparatus comprising a casing shaped to provide a pulverizing chamber and a fan chamber communicating therewith, a rotatable shaft, bearings supporting the shaft, a hollow rotatable shaft substantially aligned with the first shaft, bearings supporting the hollow shaft independently of the first shaft, a pulverizing rotor secured to one of the shafts and located within the pulverizing chamber, a fan secured to the other shaft and located within the fan chamber, and a shaft extending through the hollow shaft and operatively connecting the other aligned shaft to the remote end of the hollow shaft.

9. A pulverizing apparatus comprising a casing shaped to provide a pulverizing chamber and a fan chamber communicating therewith, a motor having a rotatable shaft, a hollow rotatable shaft substantially aligned with the motor shaft, bearings supporting the hollow shaft independently of the motor shaft, a pulverizing rotor secured to one shaft and located within the pulverizing chamber, a fan secured to the other shaft and located within the fan chamber, and a shaft extending through the hollow shaft and operatively connecting the motor shaft to the remote end of the hollow shaft.

10. A pulverizing apparatus comprising a casing shaped to provide a pulverizing chamber and a fan chamber communicating therewith, a motor having a rotatable shaft, a fan secured to the motor shaft and located within the fan chamber, a hollow rotatable shaft substantially aligned with the motor shaft, bearings supporting the hollow shaft independently of the motor shaft, a pulverizing rotor secured to the hollow shaft and located within the pulverizing chamber, and a shaft extending through the hollow shaft and operatively connecting the motor shaft to the remote end of the hollow shaft.

11. A pulverizing apparatus comprising a casing shaped to provide a pulverizing chamber and a fan chamber communicating therewith, a pulverizing rotor located within the pulverizing chamber, a fan located within the fan chamber, said rotor and fan forming rotatable elements, an electric motor having inner and outer end-plates, the inner end-plate being secured to the casing and arranged to form a wall for one of the chambers, a bearing on each end plate, a rotatable motor shaft supported in said bearings, fan blades secured to the motor shaft near the outer end-plate and arranged to force air through the motor in a general direction toward the inner end-plate, means forming a by-pass through which air may flow from the zone of the motor adjacent to the inner end-plate to a point between the inner end-plate and the adjacent rotatable element, and driving connections from the motor shaft to both the pulverizing rotor and the fan.

12. A pulverizing apparatus comprising a casing shaped to provide a pulverizing chamber and a fan chamber communicating therewith, a removable plate secured to the casing and forming the wall of the pulverizing chamber remote from the fan chamber, a shaft rotatably supported by the plate, a pulverizing rotor secured to the shaft and located within the pulverizing chamber, a second rotatable shaft extending into the fan chamber in substantial alignment with the first shaft, means providing a releasable operative connection between the shafts, bearings supporting the second shaft independently of the first shaft, a fan secured to the second shaft and located within the fan chamber, and driving means for one of the shafts.

13. A pulverizing apparatus comprising a casing shaped to provide a pulverizing chamber having an outlet opening, a fan arranged to pass a current of air through the chamber and outlet to remove pulverized material, a rejector device shaped as a screw propeller mounted adjacent the outlet, and means to revolve the rejector device with the fan in such a direction that the rejector device will tend to oppose the outward flow of said air current and the entrained particles, the rejector device serving to strike coarse particles of material and throw them back into the pulverizing chamber.

L. V. ANDREWS.